(12) United States Patent
Lenz et al.

(10) Patent No.: US 8,526,011 B2
(45) Date of Patent: Sep. 3, 2013

(54) MOBILE PROJECTION SYSTEM FOR SCALING AND ORIENTATION OF SURFACES SURVEYED BY AN OPTICAL MEASURING SYSTEM

(75) Inventors: Gunther Lenz, Graz (AT); Andreas Gaich, Stainz (AT)

(73) Assignee: 3GSM GmbH, Graz (AT)

( * ) Notice: Subject to any disclaimer, the term of this patent is extended or adjusted under 35 U.S.C. 154(b) by 0 days.

(21) Appl. No.: 13/202,575

(22) PCT Filed: Feb. 18, 2010

(86) PCT No.: PCT/EP2010/052081
§ 371 (c)(1),
(2), (4) Date: Oct. 17, 2011

(87) PCT Pub. No.: WO2010/094751
PCT Pub. Date: Aug. 26, 2010

(65) Prior Publication Data
US 2012/0038932 A1  Feb. 16, 2012

(30) Foreign Application Priority Data

Feb. 20, 2009 (EP) .................................... 09153316

(51) Int. Cl.
*G01B 11/24* (2006.01)
(52) U.S. Cl.
USPC .......................................... 356/601; 356/603

(58) Field of Classification Search
USPC ................................................ 356/601–623
See application file for complete search history.

(56) References Cited

U.S. PATENT DOCUMENTS

| 4,948,258 | A | | 8/1990 | Caimi |
| 5,003,187 | A | | 3/1991 | Zumbrunn et al. |
| 5,372,502 | A | | 12/1994 | Massen et al. |
| 6,024,449 | A | * | 2/2000 | Smith ........................ 351/212 |
| 6,542,250 | B1 | * | 4/2003 | Michaelis et al. ............ 356/601 |

FOREIGN PATENT DOCUMENTS

| DE | 101 37 241 A1 | 9/2002 |
| JP | 2003-035536 A | 2/2003 |

* cited by examiner

*Primary Examiner* — Tri T Ton
(74) *Attorney, Agent, or Firm* — Robert A. Blaha; Smith Risley Tempel Santos LLC (57) ABSTRACT

The present invention describes a device for surveying a surface (104) in a real world coordinate system (111). The device comprises a pattern projecting unit (101) adapted for projecting a predefined pattern (105) onto the surface (104), an optical measurement system (102) adapted for determining positional and image data of a projected pattern (106) on the surface (104), wherein the positional and image data are indicative of the predefined pattern (105) in a measuring coordinate system (112), and a processing unit (103) adapted for determining transformation data based on the predefined pattern (105) and the determined positional and image data of the projected pattern (106). The transformation data allow a transformation between the real world coordinate system (111) and the measuring coordinate system (112) to thereby survey the surface (104).

4 Claims, 4 Drawing Sheets

MOBILE PROJECTION SYSTEM FOR SCALING AND ORIENTATION OF SURFACES SURVEYED BY AN OPTICAL MEASURING SYSTEM

REFERENCE TO RELATED APPLICATION

This application claims the benefit of the filing date of the European Patent Application 09153316.6, filed Feb. 20, 2009, the disclosure of which application is hereby incorporated herein by reference.

FIELD OF THE INVENTION

The invention relates to a device for surveying a surface and to a method of surveying a surface. Moreover, the present invention relates to a computer-readable medium in which a computer program for surveying a surface in a real world coordinate system is stored and to a program element for surveying a surface in the real world coordinate system.

BACKGROUND OF THE INVENTION

Underground construction works in rock require knowledge on the rock mass in order to take account for the actual conditions. One important source of information is related to geological mapping. Among others geological mapping includes gathering data on (i) geometric properties of the rock surface as well as (ii) spatial orientation information on discontinuities in the rock mass.

The measurement of discontinuities during conventional geological mapping requires manual access to the rock surface. This may need work in hazardous areas. Therefore contact free measuring principles such as Photogrammetry or Laserscanning highly facilitate geological mapping and increase safety.

Knowledge on the rock geometry is furthermore required in performing blasting works both on surface and underground.

The results from contact free measuring systems include three-dimensional measurements (points) from the rock surface ideally combined with visual information as from photos. For geological mapping the acquired rock surfaces require correct scale and correct spatial orientation.

A conventional approach to provide scale and orientation is the use of so-called control points, i.e. known locations in a given coordinate system. Another possibility is the use of objects of known geometry and orientation (marker elements). They are placed on the surface of interest or somewhere in the area of interest. When the surface is acquired by an optical measuring system the marker elements are identified and their known geometry and/or orientation are used to scale and/or orientate the whole surface measurement.

The placement of the marker elements may require working in hazardous areas and may cost additional efforts such as time.

Existing systems for determining and surveying rock, terrain and object surfaces include ShapeMetriX3D and BlastMetriX3D.

DE 101 37 241 A1 discloses an arrangement that records partial views of the object and registers the views in a global coordinate system. The arrangement comprises an image acquisition system, at least one location camera and a computer unit. Markers are optically projected onto the object and acquired by the location camera. The computer unit records the partial views of the object in the global coordinate system using the information of the detected markers.

JP 2003-035536 A discloses a displacement measurement for determining relative displacements of two cross sections, one of a tunnel and one of an excavated cross-section. A camera is provided that is adapted for taking a picture of a facing of the tunnel. Moreover, a picture of the excavated cross-section is taken. Measuring targets and standard points in the respective pictures are compared to each other in order to measure a displacement between the tunnel and the excavated cross-section.

OBJECT AND SUMMARY OF THE INVENTION

It is an object of the present invention to provide a proper scaling and orientation mechanism for surveying of surfaces e.g. rock surfaces, terrain surfaces, or natural or artificial object surfaces.

In order to achieve the object defined above, a device for surveying a surface and a method for surveying a surface according to the independent claims are provided. Moreover, a computer-readable medium, in which a computer program for surveying a surface is stored, and a program element for surveying a surface according to the independent claims are provided.

According to a first exemplary embodiment of the present invention, a device for surveying a surface in a real world coordinate system is provided. The device comprises a pattern projecting unit adapted for projecting a predefined pattern onto the surface. Moreover, the device comprises an optical measurement system capable to capture positional and image data of a projected pattern on the surface, wherein the positional and image data are indicative of the predefined pattern in a measuring coordinate system. Furthermore, the device comprises a processing unit adapted for determining transformation data based on the predefined pattern and the positional and image data of the projected pattern. The transformation data allow a transformation between the real world coordinate system and the measuring coordinate system to thereby survey the surface.

According to a further exemplary embodiment, a method of surveying a surface in a real world coordinate system is provided. According to the method, a predefined pattern is projected onto the surface. Positional and image data of a projected pattern on the surface are determined, wherein the positional and image data are indicative of the predefined pattern in a measuring coordinate system. The transformation data is determined based on the predefined pattern and the determined positional and image data of the projected pattern. The transformation data allow a transformation between the real world coordinate system and the measuring coordinate system to thereby survey the surface.

According to a further exemplary embodiment, a computer-readable medium is provided in which a computer program for surveying a surface in a real world coordinate system is stored. The computer program allows determining positional data of a projected pattern that are projected onto the surface. The positional and image data are indicative of the predefined pattern in a measuring coordinate system. Moreover, according to the method, transformation data are determined based on the determined positional data of the projected pattern. The transformation data allow a transformation between the real world coordinate system and the measuring coordinate system to thereby survey the surface.

According to a further exemplary embodiment, a program element for surveying a surface in a real world coordinate system is provided. The program element, when being executed by a processor, is adapted to carry out a method.

According to the method, positional and image data of a projected pattern on the surface are determined, wherein the positional and image data are indicative of the predefined pattern in a measuring coordinate system. Transformation data are determined based on the predefined pattern and the determined positional and image data of the projected pattern. The transformation data allow a transformation between the real world coordinate system and the measuring coordinate system to thereby survey the surface.

The term "pattern projecting unit" may be described by a unit that projects a predefined pattern to the surface, for instance by laser pointers or other sources producing electromagnetic radiation. The pattern projecting unit projects the predefined pattern. The predefined pattern may be defined by at least three reference points in a known geometric arrangement, so that distances between the reference points are known. The projected pattern is generated by projecting the predefined pattern by the pattern projecting unit to the surface.

By the term "optical measuring system" a system may be described having the ability to acquire optical and positional information (data) of the projected pattern on the surface. The optical measuring system may comprise one or more cameras, in particular digital cameras, that may detect or determine image data, in particular visible data, for providing a picture (e.g. stereoscopic picture) of the surface including the projected pattern. The optical measuring system may further comprise a total station, a laser scanner, a combination of afore said or any other optical device or system that allows the acquisition of three-dimensional data. For example, the three-dimensional data may originate from a combination of two or more photos or a combination of a laser scanner with a (digital) camera. Next, by means of the determined image data, the positional data may be determined. The positional data determine the position of the predefined pattern projected on the surface (i.e. the projected pattern) respectively on the picture that is defined by the image data. Therefore, a mechanism, such as a computer, may detect the projected pattern, e.g. the projected laser points, on the picture and assign the positions of the projected pattern to a coordinate system (e.g. the measuring coordinate system (u, v, w)). Hence, the position of the projected pattern may be defined by coordinates (u, v, w) in the coordinate system, so that the position of the projected pattern on the image may be determined.

The term "processing unit" may describe a computer or a microprocessor device.

The pattern projecting unit, the optical measuring system, and the processing unit may be located in a common carrier or housing. Alternatively, each of the units, namely the pattern projecting unit, the optical measuring system and the processing unit may be positioned at separate locations, e.g. independent from each other.

The term "surface" may describe different natural or artificial surface types, e.g. rock surfaces, terrain surfaces, or any other regular or irregular surface of an object (e.g. a house wall).

The term "predefined pattern" describes a pattern that may be generated by at least three predefined reference points in a known geometric arrangement, i.e. distances between the reference points are known. The connection of the predefined points may form a shape. The shape of the predefined pattern may comprise e.g. triangles, quadrangles, trapezes, rectangles, pentagons and polygons. The shape of the predefined pattern may be defined depending on the amount of predefined reference points provided by the pattern projecting unit.

The term "projected pattern" may define the pattern that is generated by the projection of the predefined pattern onto the surface. In general the predefined pattern when projected onto a surface will be represented as a distorted version of the pattern.

The predefined pattern may be formed by at least three predefined reference points that are defined in a real world coordinate system. The "real world coordinate system" may be a Cartesian coordinate system, for instance with a r-axis, a s-axis and a t-axis that are orientated perpendicular with respect to each other.

The projected pattern may be generated by a projection of predefined reference points onto the surface. The projected reference points may form the projected pattern, wherein the projected reference points are defined by coordinates in the measuring coordinate system. The measuring coordinate system may be a Cartesian coordinate system comprising an u-axis, a v-axis and a w-axis, wherein the axes are orientated perpendicular to each other.

In conventional systems, in order to position the marker elements on the surface, a person has to place the marker elements in a potentially hazardous area in the vicinity of the surface, so that the risk of falling rock may exist. Moreover, the step of positioning the marker elements in the vicinity of the surface increases the efforts (e.g. time) for surveying of the surface.

By the present invention a surface may be surveyed without the need of adjusting the pattern projecting unit and the camera, respectively the optical measurement system. I.e. the geometric arrangement of the units may not be known. Moreover, by the surveying methods and device of the present invention, it is not necessary to adjust and place marker elements with known sizes in the vicinity of the surface to be surveyed. Thus, this will also reduce costs because there is no need to place such marker elements. Moreover, due to the omission of placing sized marker elements in the vicinity of the surface, a time consuming arrangement of the units may be unnecessary.

In other words, by projecting a predefined pattern onto the surface to be surveyed and by determining coordinates of the projected pattern on the surface by the optical measurement system on the basis of the determined positional and image data, transformation data may be determined with which the surveying of the surface may be provided. The geometric arrangement of the pattern projecting unit, the optical measurement system and the surface itself may not be known. A positioning of physical markers on or aside the surface may be omitted.

Transformation data allow a transformation between points from the measuring coordinate system to the real world coordinate system. Analogous, a distance taken from the surface in the measuring coordinate system may be converted to a distance in the real world coordinate system. Thus, when providing the possibility to convert distances in the measuring coordinate system to real distances in the real world coordinate system, an efficient and safe surveying device for various surfaces such as rock, terrain, or other objects, e.g. house walls, is provided.

According to a further exemplary embodiment, the transformation data include a scaling factor adapted for transforming the length of a line segment taken in the measuring coordinate system to a real length of the line segment in the real world coordinate system. The scaling factor may be determined by comparison steps respectively by a comparative calculation. In particular, the scaling factor may be determined by comparing ratios and differences of distances between the projected reference points in the measuring coordinate system and corresponding ratios and differences of distances of the predefined reference points in the real world coordinate system. Thus, the surface may be surveyed in such a way that distances of arbitrary line segments in the measuring coordinate system may be transformed into real lengths of the line segments in the real world coordinate system. This way all measurements from the optical measurement system including the projected pattern may be correctly scaled in the real world coordinate system.

According to a further exemplary embodiment, the pattern projecting unit comprises at least three projection elements. The arrangement of the projection elements forms the predefined pattern, wherein the projection elements are adapted for projecting the projected pattern onto the surface. When three (non collinear) projection elements are provided, by connecting each projection element a triangular shaped predefined pattern may be generated. When for instance four non collinear projection elements are provided, a rectangle or a quadrangle shape of the predefined pattern may be generated. The more projection elements are provided, the more predefined reference points are provided and thus more line segments between the predefined reference points are known, so that a more detailed transformation data may be provided. Thus, the conversion of a desired length of a line segment from the measuring coordinate system into the real world coordinate system may be more detailed.

According to a further exemplary embodiment, at least one of the at least three projection elements comprises a laser pointer or a laser projector. By the use of a laser pointer a straight laser beam may be generated, so that the predefined reference points respectively the predefined pattern may be projected onto the surface. The laser pointer may be adapted for generating any kind of electromagnetic radiation that is appropriate for being measured by the optical measurement system. The laser pointer may furthermore generate infrared radiation or radiation with any kind of visible colors, such as red, green, blue, etc. Besides the laser pointer, any kind of light generation devices may be applied that are suitable for generating light beams, such as LEDs or light spots, etc.

According to a further exemplary embodiment, the predefined pattern is selected from the group consisting of triangles, quadrangles, trapezes, rectangles, pentagons and polygons.

According to a further exemplary embodiment, the projection device further comprises an orientation device for determining orientation data of the pattern projecting unit in the real world coordinate system with respect to a reference coordinate system. The orientation data are adapted for generating a rotation matrix of the transformation data.

The reference coordinate system may comprise a x-axis, a y-axis and a z-axis, wherein each of the axes are perpendicular to each other.

Moreover, the reference coordinate system may be a north directed coordinate system, i.e. the x-axis may direct to the North Pole, the y-axis may represent the horizon and the z-axis may represent a vertical direction.

The pattern projecting unit may be installed in arbitrary orientation with respect to the reference coordinate system, i.e. the t-axis of the real world coordinate system of the pattern projecting unit may be nonparallel to the z-axis of the reference coordinate system. Thus, when determining the rotation of the real world coordinate system to the reference coordinate system, an orientation of the surface to the reference coordinate system may be provided. The rotation of the real world coordinate system to the reference coordinate system may be defined by an azimuth direction angle (angle between the north directed x-axis and the r-axis) and an elevation angle (angle between the horizontal z-axis and the t-axis, inclination). When the azimuth direction angle and/or the elevation angle are known, a rotation matrix may be determined. By the rotation matrix, arbitrary points taken from the surface in the measuring coordinate systems may be transferred into the real world coordinate system and furthermore into the reference coordinate system. Thus, besides the determination of a scaling factor for determining certain distances on the surface, an orientation of the surface with respect to the real world coordinate system and the reference coordinate system may be achieved as well. Thus, not only distances but also orientations of the surface may be determined.

According to a further exemplary embodiment, the orientation device is selected from the group consisting of inclinometer devices, compass devices, gyro-compass devices, gyroscope devices, inertial navigation systems, goniometer devices and geodic measurement devices. The orientation device may measure the azimuth and the elevation angle.

According to an exemplary embodiment of the method, the predefined pattern is projected onto the surface by parallel projection beams, e.g. by providing laser beams, wherein the parallel laser beams are emitted from sources of projection, such as laser pointers. The laser pointers generate the projection beams that extend from the predefined reference points in a direction to the surface and thereby generate the projected reference points on the surface. Thus, a distortion of the projected pattern caused by a nonparallel direction of the projection beams may be omitted, so that any distortion of the projected pattern in the measuring coordinate system may only originate from the spatial position of the surface itself. Thus, more detailed transformation data may be generated without having disturbing factors in the measurement result.

According to a further exemplary embodiment of the method, the determining of the transformation data furthermore comprises the determining of a transformation plane in the measuring coordinate system in such a way, that the direction of a normal to the transformation plane is parallel with the (parallel) projection beams. The projected pattern is projected along the direction of the normal to the transformation plane onto the transformation plane, so that an undistorted pattern of the projecting pattern with respect to the predefined pattern is projected onto the transformation plane in the measuring coordinate system. A distance between the reference points of the undistorted pattern on the transformation plane is measured. The scaling factor is determined by determining a ratio between distances between the reference points of the undistorted pattern on the transformation plane and corresponding distances between the predefined reference points of the predefined pattern in the real world coordinate system.

By determining the "transformation plane" with a normal that is parallel to the parallel projection beams, the projected pattern may be projected onto the transformation plane in an undistorted manner, i.e. the relation of the ratios between the distances of the projected reference points may be equal or close to equal to the distance ratios of the distances between the predefined reference points of the predefined pattern in the real world coordinate system. In other words, the perimeter or the overall size of the undistorted pattern may differ to the predefined pattern, but the aspect ratio or length ratios between predefined reference points and projected points are ideally equal.

According to a further exemplary embodiment of the method, the determining of the transformation plane further comprises a determining of first ratios and/or first differences of distances between at least three projected reference points of the undistorted pattern onto the transformation plane in the measuring coordinate system. Furthermore, second ratios and/or second differences of distances between at least three predefined reference points of the predefined pattern in the real world coordinate system are determined. Next, the normal of the transformation plane is varied until a total difference between the first ratios and/or first differences with respect to the second ratios and/or second differences is minimized. Thus, when the total difference is minimized, the normal to the transformation plane and the direction of the projection beams may be equal. Thus, the projected reference points projected onto the transformation plane in the measuring coordinate system reproduce the projected pattern on the transformation plane in an undistorted shape in the real world coordinate system. Thus, distances of the projected reference points on the transformation plane may be measured and may be related to corresponding distances of the predefined reference points. Hence, the scaling factor may be determined, because an undistorted pattern of the predefined pattern in the transformation plane remains undistorted.

According to a further exemplary embodiment, an orientation of the parallel projection beams in the real world coordinate system with respect to a reference coordinate system is measured. A rotation matrix of the transformation data on the basis of the measured orientation of the parallel projection beams is determined, so that by the rotation matrix the orientation of the surface in a reference coordinate system is determined. Thus, by the rotation matrix the orientation of the surface with respect to a reference coordinate system and thus to a horizontal or vertical plane may be determined, so that the orientation of the surface may be determined as well.

Thus, when providing transformation data comprising a scaling factor and the rotation matrix, true lengths between projected points in the measuring coordinate system may be measured and moreover the orientation of the surface in the measuring coordinate system with respect to a reference coordinate system may be determined. The surface may be surveyed, namely by the scaling factor and by the rotation matrix.

According to a further exemplary embodiment, the orientation of the parallel projection beams in the real world coordinate system with respect to the reference coordinate system is defined by the azimuth direction angle and the elevation angle.

In other words, with the present invention by predefined projection elements, such as laser elements, predefined reference points may provide a predefined pattern that may be projected to the surface. The projection elements produce a projected pattern onto the surface. The geometric arrangement of the predefined pattern is known, i.e. positions of single projection elements among each other or distances between them are known. By the optical measurement system coordinates of the projected reference points respectively the projected pattern are determined. The optical measurement system provides three-dimensional coordinates of the surface and the projected reference points. The optical measurement system may base on Photogrammetry, LIDAR, a combination of both, or other optical methods.

By comparing the projected reference points with the known geometric arrangement of the predefined reference points, respectively the predefined pattern, transformation data are determined. The transformation data may comprise a scaling factor and a rotation matrix.

By the scaling factor, it is possible to measure an arbitrary line segment on the surface in the measuring coordinate system and to transform the measured length into a real length of the line segment in the real world coordinate system. When additional devices measure the azimuth direction angle and the elevation angle of the projecting beams a rotation matrix may be determined that allows an orientation of the surface in the real world coordinate system.

The aspects defined above and further aspects of the invention are apparent from the examples of the embodiment to be described hereinafter and are explained with reference to these examples of embodiment. The exemplary embodiments described for the device for surveying a surface may also be applied to exemplary embodiments of the method, the computer-readable medium, the program element and vice versa.

BRIEF DESCRIPTION OF THE DRAWINGS

In the following, exemplary embodiments of the present invention will be specified for further explanation and for a better understanding with reference to the attached drawings.

DESCRIPTION OF EMBODIMENTS

The illustrations in the drawings are schematical. In different drawings similar or identical elements are provided with the same reference signs. The view in the figures is schematical and not fully scaled.

Figure 1:
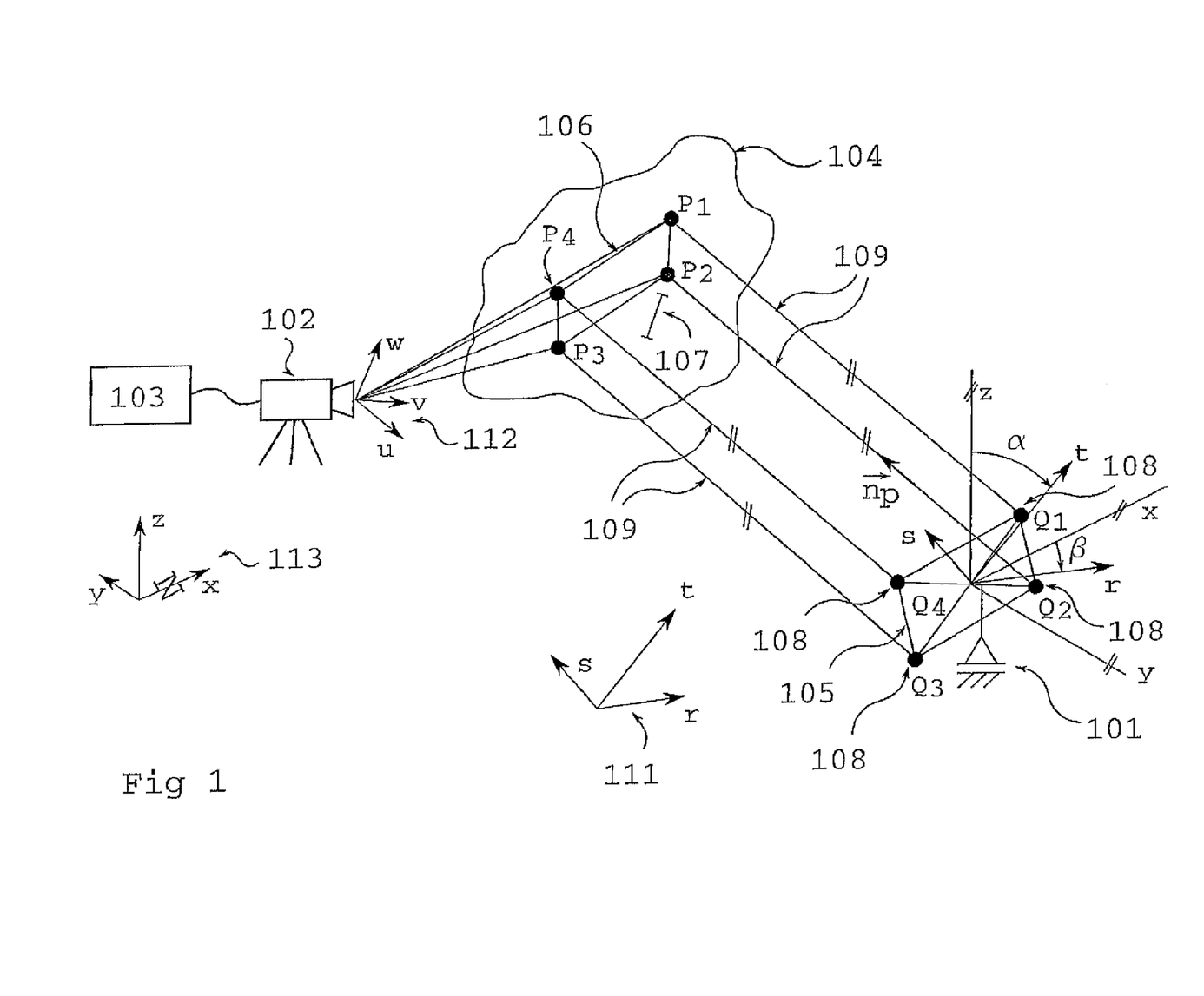
FIG. 1 illustrates arrangements of a device for surveying a surface according to an exemplary embodiment of the present invention.

FIG. 1 illustrates a device for surveying a surface 104 in the real world coordinate system 111. The device comprises a pattern projecting unit 101, an optical measurement system 102 and a processing unit 103. The pattern projecting unit 101 is adapted for projecting a predefined pattern 105 onto the surface 104. The optical measurement system 102 is adapted for determining positional and image data of a projected pattern 106 on the surface 104, wherein the image data are indicative of the predefined pattern 105 in a measuring coordinate system 112. The processing unit 103 is adapted for determining transformation data based on the predefined pattern 105 and the determined positional and image data of the projected pattern 106. The transformation data allow a transformation between the real world coordinate system 111 and the measuring coordinate system 112 to thereby survey the surface 104.

Furthermore, FIG. 1 illustrates the basic principle of the device and the method for surveying the surface 104. In the real world coordinate system 111 the pattern projecting unit 101 is located and defined. The pattern projecting unit 101 may project the predefined pattern 105 onto the surface 104. The predefined pattern 105 may be defined by at least three projection elements 108. The projection elements 108 form the predefined pattern by their location and may comprise laser pointers. In other words, the projection elements 108 form the predefined reference points Q of the predefined pattern 105. The laser pointers may generate projecting beams 109 with which the predefined pattern 105 may be projected onto the surface 104. The projecting beams 109 may be parallel to each other. The direction of the projecting beams 109 may be defined by a direction $n_p$. Each of the projection elements 108 may define predefined reference points Q that may provide the position data with the coordinates r, s, t in the real world coordinate system 111 as shown in FIG. 1.

Onto the surface 104 the predefined pattern is projected. The projecting beams 109 project each predefined reference point Q onto the surface 104. The predefined reference points Q are defined on the surface 104 by the projected reference points P in the measuring coordinate system 112 with the coordinates P (u,v,w). As shown in FIG. 1, due to the different orientation of the surface 104, the projected pattern 106 is distorted with respect to the predefined pattern 105 in the real world coordinate system 111.

The optical measurement system 102 determines positional and image data of the projected pattern 106 on the surface 104. The optical measurement system 102 may comprise e.g. a camera, such as a digital camera. The image data may define for instance a picture, in particular a stereoscopic picture, on which the projected pattern 106 on the surface 104 inclusively the projected reference points P are shown. The positional and image data are indicative of the predefined pattern on the surface 104 in the measuring coordinate system 112 (P (u,v,w)).

The processing unit 103 receives the positional and image data, in particular the projected reference points P with its positional coordinates P (u,v,w), and the predefined reference points Q with their known geometric arrangement in the real world coordinate system 111 Q (r,s,t).

Based on the known geometric arrangement of the predefined pattern 105 in the real world coordinate system 111 and based on the positional and image data of the projected pattern 106 in the measuring coordinate system 112, the processing unit 103 may determine transformation data with which the measuring coordinate system 112 may be transformed into a coordinate system that is aligned parallel to the real world coordinate system 111 and is equally scaled like the real world coordinate system 111. By such transformation the surface 104 may be surveyed because for instance distances and orientations of the projected reference points P or any other arbitrary distances and orientations on the surface 104 may be transformed from the measuring coordinate system 112 into the real world coordinate system 111, so that true orientations and distances in the real world coordinate system 111 may be determined from the optical measurement system 102 in the measuring coordinate system 112.

Thus, when determining the transformation data, for instance a scaling factor and a rotation matrix, e.g. a length and an orientation of an arbitrary line segment 107 taken from the surface 104 in particular taken from the positional and image data may be transformed to the real world coordinate system 111.

As shown in FIG. 1 the position of the pattern projecting unit 101, the surface 104 and/or the optical measurement system 102 may be chosen arbitrarily, so that no time consuming arrangement steps of each unit (101, 102) with respect to the surface 104 have to be accomplished. Moreover, to the surface 104 to be surveyed, no marker elements or other equipment has to be provided physically, so that no further installation work in a vicinity of the surface 104 and thus in potentially hazardous area has to be done.

Furthermore, as shown in FIG. 1, a rotation or an inclination of the real world coordinate system 111 (r, s, t) with respect to a reference coordinate system 113 (x, y, z) may be determined by measuring an azimuth direction angle β and an elevation angle α, wherein the azimuth direction angle β may define a rotation of the r-axis of the real world coordinate system 111 with respect to an north directed x-axis of the reference coordinate system 113. The elevation angle α may define an angle between the t-axis of the real world coordinate system 111 with respect to a vertical z-axis of the reference coordinate system 113. Thus, by determining the azimuth direction angle β and the elevation angle α, a certain orientation of the surface 104 and an orientation of the pattern projecting unit 101 respectively the orientation of the predefined pattern 105 with respect to the determined reference coordinate system 113 may be determined.

The reference coordinate system 113 may be a north directed coordinate system, i.e. the reference coordinate system may comprise the coordinates x, y, z, wherein the x-axis is provided in a north direction, the y-axis provides a horizontal direction and the z-axis provides a vertical direction.

Figure 2:
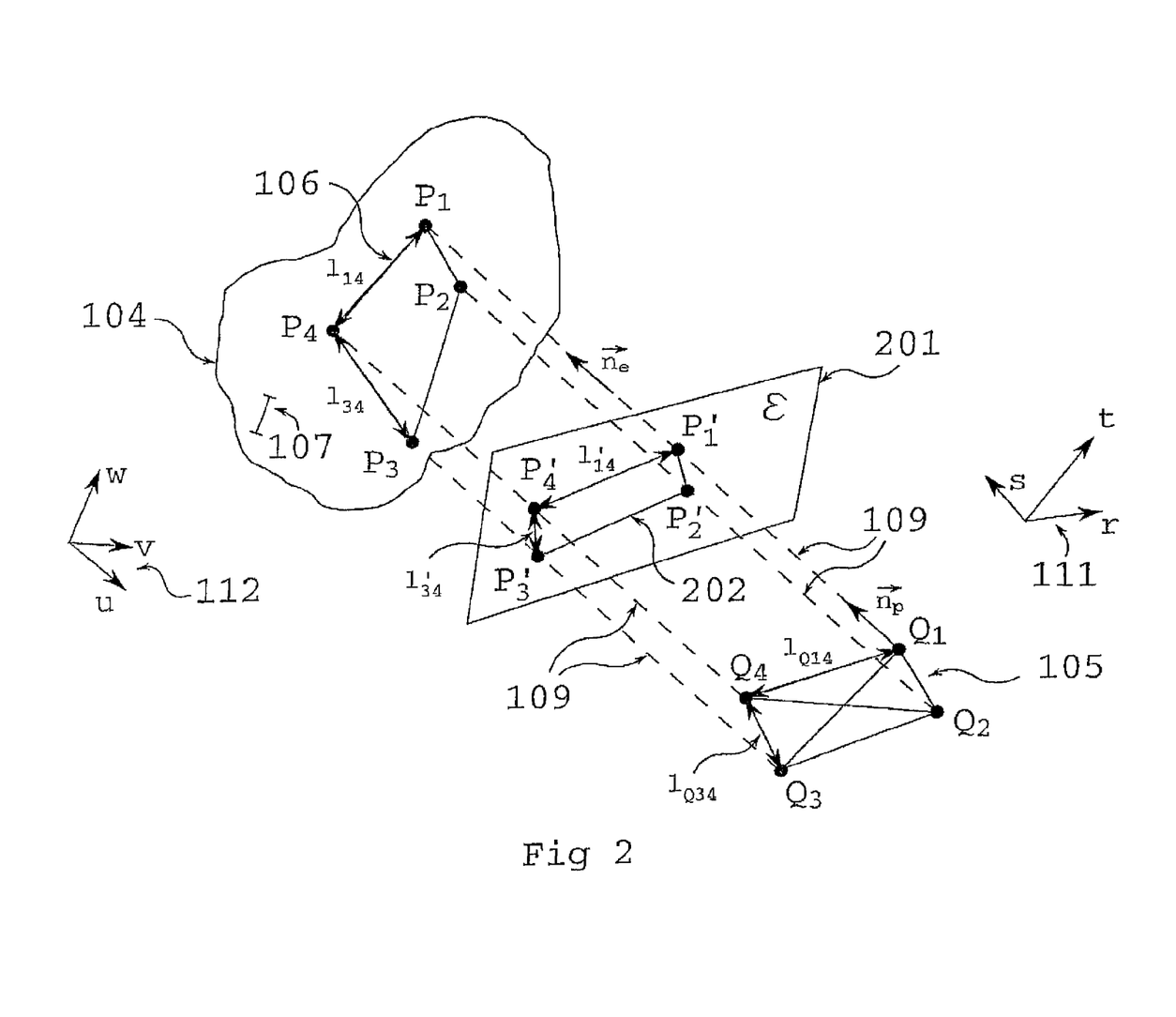
FIG. 2 illustrates a schematical view of determination of a transformation plane according to an exemplary embodiment of the present invention.

FIG. 2 illustrates a possibility of determining transformation data by the processing unit 103. As described above with respect to FIG. 1, the pattern projecting unit 101 provides a predefined pattern 105, wherein the predefined pattern 105 is formed by predefined reference points Q(r, s, t) in the real world coordinate system 111. The predefined pattern 105 may be defined at least by three predefined reference points Q. In the exemplary embodiment shown in FIG. 2, four predefined reference points $Q_{1-4}$ (r, s, t) define the predefined pattern 105, wherein the shape of the predefined pattern 105 may be for instance a quadrangle.

From each of the predefined reference points $Q_1$ to $Q_4$ parallel projecting beams 109 are directed with the direction of the projection beams $n_p$ to the surface 104. Each of the predefined reference points Q is projected onto the surface 104 and forms the projected reference points P, defined in the measuring coordinate system 112, so that each of the projected surface points P is defined by the coordinates u, v, w.

In general the surface 104 is not planar and not parallel to the plane of the predefined pattern 105, so that the projected pattern 106 is distorted with respect to the predefined pattern 105. Thus, the ratio of the distances between each of the predefined reference points Q and the distances between each of the projected reference points P are different due to the distorted projected pattern 106. Thus, when the projected pattern 106 is distorted, transformation data, in particular scaling factors, may not be calculated and determined due to the distorted projected pattern 106 and thus due to the distorted distances between the projected reference points P on the surface 104.

Thus, a transformation plane 201 may be defined to which the projected reference points P may be projected, so that on the transformation plane 201 the projected reference points P' on the transformation plane 201 may be determined. The projected reference points P' on the transformation plane 201 are given in the measuring coordinate system 112 with the coordinates P' (u, v, w).

Next, when the projected reference points P are projected to the projected reference points P' on the transformation plane 201 in such a way that the projected reference points P' on the transformation plane 201 forms an undistorted pattern 202 with respect to the predefined pattern 105, transformation data may be calculated. I.e. when the undistorted pattern 202 in the measuring coordinate system 112 is undistorted with respect to the predefined pattern 105 in the real world coordinate system 111, also the ratios of distances l' between the projected reference points P' on the transformation plane 201 are undistorted with respect to ratios of distances between the respective predefined reference points Q of the predefined pattern 105 in the real world coordinate system 111.

When the transformation plane 201 provides the undistorted pattern 202 and thus the undistorted distances l', a scaling factor between the sizes on the transformation plane 201 and thus on the surface 104 in the measuring coordinate system 112 and the real distances in the real world coordinate system 111 may be determined. I.e. the scaling factor may be determined for instance by:

$$I'_{14}/I_{Q14} = \text{scaling factor, or}$$

$$I'_{34}/I_{Q34} = \text{scaling factor.}$$

In order to define the transformation plane 201 on which the undistorted pattern 202 may be projected, a normal $n_e$ of the transformation plane 201 has to be parallel to a direction $n_p$ of the projection beams 109. When such a transformation plane 201 is determined, the projected reference points P may be projected with the direction $n_e = n_p$ onto the transformation plane 201, so that the projected reference points P' on the transformation plane 201 may be projected and defined in the measuring coordinate system 112.

The orientation respectively the normal $n_e$ of the transformation plane 201 may be determined before determining the scaling factor. For example in an iterative method, the projected reference points P' are projected onto the transformation plane 201, wherein the orientation of the transformation plane 201 with respect to claim of the predefined pattern 105 is not known at this point. Then, differences of distances I' or ratios between distances I' of the projected reference points P' on the transformation plane 201 are taken and compared with the respective ratios or differences of the distances $I_Q$ between the respective predefined reference points Q. When the total difference of the ratios or differences of the distances I' of the projected reference points P' in comparison to the ratios and differences of the distances $I_Q$ between the respective predefined reference points Q are minimized, the desired orientation of the transformation plane 201 is found, i.e. the normal $n_e$ of the transformation plane 201 is (almost) equal to the direction of the projection beams $n_p$. In other words, this may be achieved by e.g.:

$$P'(I'_{12}/I'_{13}) = Q(I_{Q12}/IQ_{13}).$$

Other distances $I_{xy}$, $I_{Qxy}$, are possible as well.

Thus, as described above, when the orientation and position of the transformation plane 201 meets the requirement that $n_e \approx n_p$, the projected reference points P' on the transformation plane 201 form an undistorted pattern 201 in the measuring coordinate system 112 with respect to the predefined pattern 105 in the real world coordinate system 111. I.e. the scaling factor may now be determined. By this scaling factor each distance on the surface 104 respectively each distance in the measuring coordinate system 112 may be taken and transformed into a real distance in the real world coordinate system 111.

As described above, the desired transformation plane 201 including the normal $n_e = n_p$ has to be determined e.g. by an iterative method. I.e. a plurality of different orientations of the transformation plane 201 may be sampled, until the desired transformation plane 201 is formed, wherein the normals are approx. $n_e = n_p$. This may be done by the program element or a computer readable medium in which a computer program is stored.

Besides the iterative method for calculating the transformation plane 201, alternatively the transformation plane 201 including the normal $n_e = n_p$ may also be predetermined or directly calculated so that no iterative steps may be necessary.

Figure 3A:
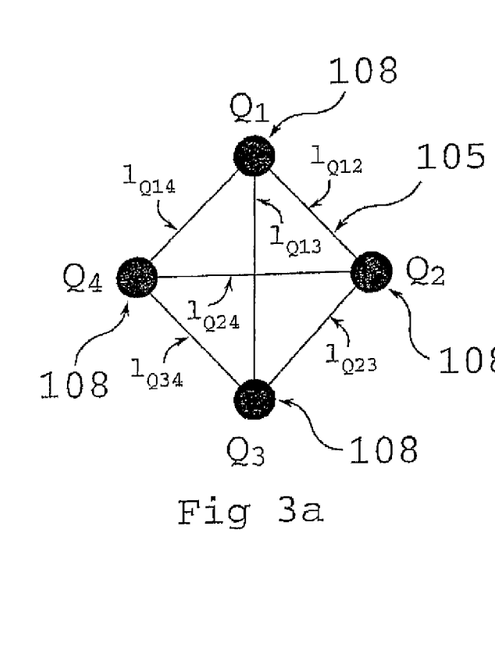
FIG. 3a-3c illustrates a schematical view of predefined patterns and projected patterns according to an exemplary embodiment of the present invention.
Figure 3B:
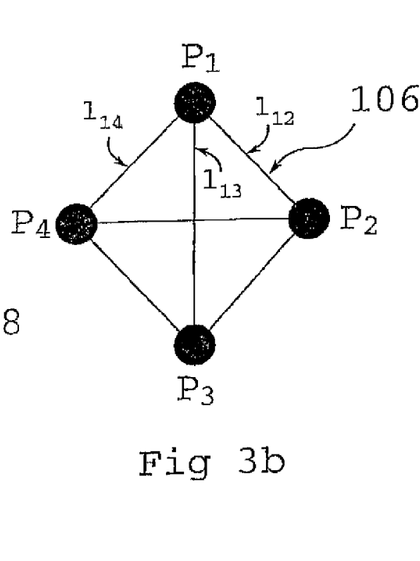
Figure 3C:
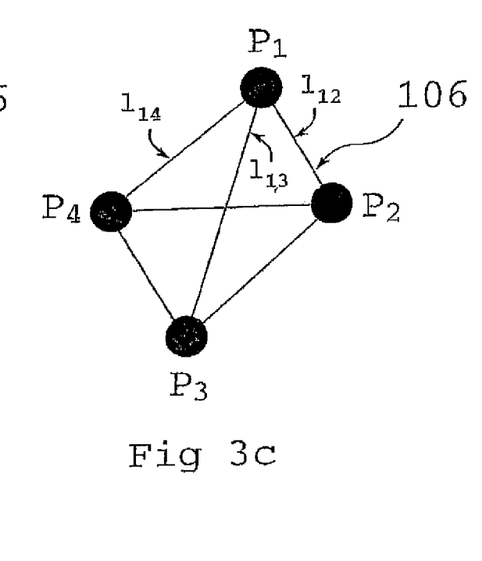

FIGS. 3a to 3c illustrate predefined patterns 105 and the respective projected pattern 106. FIG. 3a illustrates a predefined pattern 105 defined by four predefined reference points $Q_1$ to $Q_4$, wherein the predefined reference points Q are defined in the real world coordinate system 111 with the coordinates Q (r, s, t). Moreover, the distances $I_Q$ between each of the predefined reference points Q are known and predefined. The predefined pattern 105 shown in FIG. 3a forms a quadrangle with the four predefined reference points Q. Besides the quadrangle, at least three predefined reference points Q may form a triangular shaped predefined pattern 105. But also more than three or four predefined reference points Q may be provided in order to provide a polygonal shape of the predefined pattern 105.

FIG. 3b illustrates a projected pattern 106 for the base that the surface 104 is planar and parallel with the surface of the predefined pattern 105 (i.e. the normals of the planes are parallel). Thus, when the predefined reference points Q are projected for instance by projection elements 108, such as laser pointers, to the surface 104 an undistorted projected pattern 106 may be determined. Thus, also the distances I between the projected reference points P may provide equal ratios with respect to ratios of the distances $I_Q$ between the predefined reference points Q.

FIG. 3c illustrates a projected pattern 106 that is distorted due to a non-planar or non-parallel surface 104 with respect to the plane of the predefined pattern 105. Thus, in the distorted projected pattern 106, the ratios of the distances I between the projected reference points P in comparison to the distances $I_Q$ of the predefined reference points Q are different, so that, for instance the scaling factor, may not be determined.

Thus, a transformation plane 201 has to be determined by the method described above, so that an undistorted pattern 202 may be found from which a true ratio between the distances I' of the projected reference points P' in comparison to the ratios of the distances $I_Q$ of the predefined reference points Q may be determined.

Figure 4:
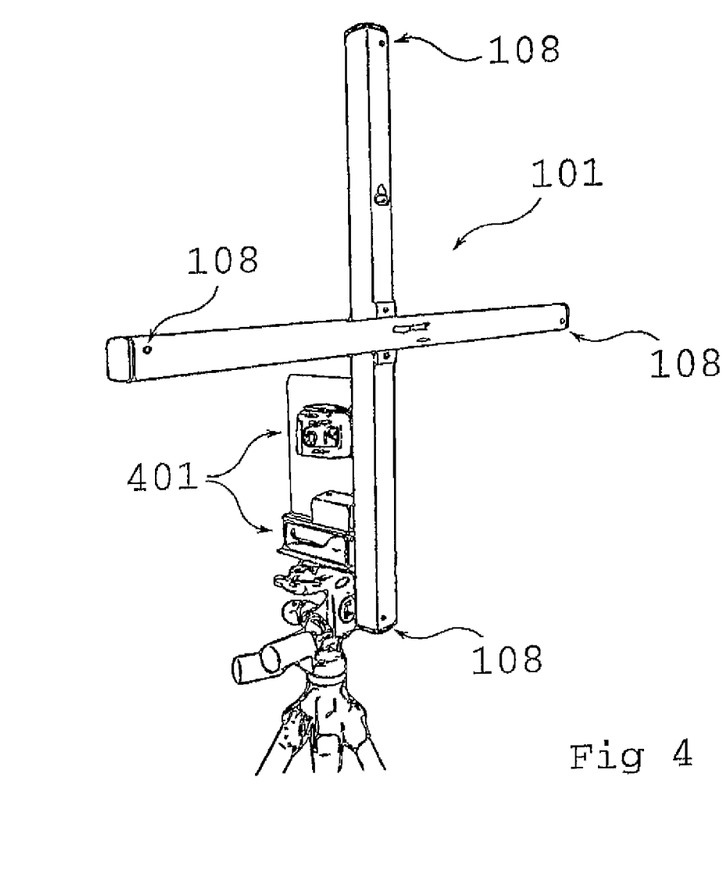
FIG. 4 illustrates a schematical view of a pattern projecting unit according to an exemplary embodiment of the present invention.

FIG. 4 illustrates an exemplary embodiment of the pattern projecting unit 101. To the pattern projecting unit 101 projection elements 108, such as laser pointers, are installed, wherein the projection elements 108 are positioned in different positions with respect to each other. In FIG. 4, four projection elements 108 are shown. Besides the four projection elements 108, three or more projection elements 108 may be used for defining the predefined pattern 105. Moreover, to the pattern projection unit 101 a variety of different orientation devices 401 may be attached to. The orientation devices 401 may comprise for instance geodetic devices or compass devices with which an orientation of the pattern projecting unit 101 in the real world coordinate system 111 with respect to the reference coordinate system 113 may be determined.

Thus, by the orientation devices 401 an azimuth direction angle β and/or an elevation angle α may be determined in order to define an orientation matrix with which the predefined reference points Q in the real world coordinate system 111 and the projected reference points P in the measuring coordinate system 112 may be transformed into the reference coordinate system 113 by the rotation matrix. Thus, besides the scaling factor or besides a scaling of the surface 104 also an orientation of the surface 104 may be determined without providing marker elements or other elements in the vicinity respectively in the potentially hazardous area of the surface 104 itself.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

REFERENCE NUMERALS 101 pattern projecting unit
102 optical measurement system
103 processing unit
104 surface
105 predefined pattern
106 projected pattern
107 line segment
108 projection element
109 projecting beam
111 real world coordinate system
112 measuring coordinate system
113 reference coordinate system
201 transformation plane
202 undistorted pattern
401 orientation device
α elevation angle
β azimuth direction angle
$n_e$ normal of transformation plane
$n_P$ direction of projection beams
P projected reference points
Q predefined reference points
P' projected reference points projected onto the transformation plane
$l_Q$ lengths between two predefined reference points
l lengths between two projected reference points
l' lengths between two projected reference points projected onto the transformation plane

The invention claimed is:

1. A method of surveying a surface in a real world coordinate system, the method comprising:
projecting a predefined pattern onto the surface, wherein the predefined pattern is projected onto the surface by parallel projection beams;
determining positional and image data of a projected pattern on the surface, wherein the positional and image data are indicative of the predefined pattern in a measuring coordinate system;
determining transformation data based on the predefined pattern and the determined positional and image data of the projected pattern, the transformation data allowing a transformation between the real world coordinate system and the measuring coordinate system to thereby survey the surface, wherein the determining of the transformation data further includes determining a transformation plane in the measuring coordinate system in such a way that a direction of a normal of the transformation plane is parallel with the parallel projection beams,
projecting the projected pattern along the direction of the normal of the transformation plane onto the transformation plane, so that an undistorted pattern of the projected pattern with respect to the predefined pattern is projected onto the transformation plane in the measuring coordinate system,
measuring a distance between reference points of the undistorted pattern on the transformation plane, and
determining a scaling factor by determining a ratio between the distance of the reference points of the undistorted pattern on the transformation plane and a distance of the respective reference points of the predefined pattern in the real world coordinate system.

2. The method of claim 1,
wherein the determining of the transformation plane further comprises,
determining first ratios and/or first differences of distances between at least three reference points of the undistorted pattern on the transformation plane in the measuring coordinate system,
determining second ratios and/or second differences of distances between the at least three respective reference points of the predefined pattern in the real world coordinate system,
varying the normal of the transformation plane until a total difference between the first ratios and/or first differences with respect to the second ratios and/or second differences are minimized.

3. The method of claim 1, further comprising:
measuring an orientation of the parallel projection beams in the real world coordinate system with respect to a reference coordinate system, and
determining a rotation matrix of the transformation data on the basis of the measured orientation of the parallel projection beams, so that by the rotation matrix the orientation of the surface in the reference coordinate system is determined.

4. The method of claim 3,
wherein the orientation of the parallel projection beams in the real world coordinate system with respect to the reference coordinate system is defined by an azimuth direction angle and/or by an elevation angle.

* * * * *